April 1, 1924.
E. MENYHART
SOLDER HOLDER FOR SOLDERING IRONS
Filed Feb. 15, 1923
1,488,932
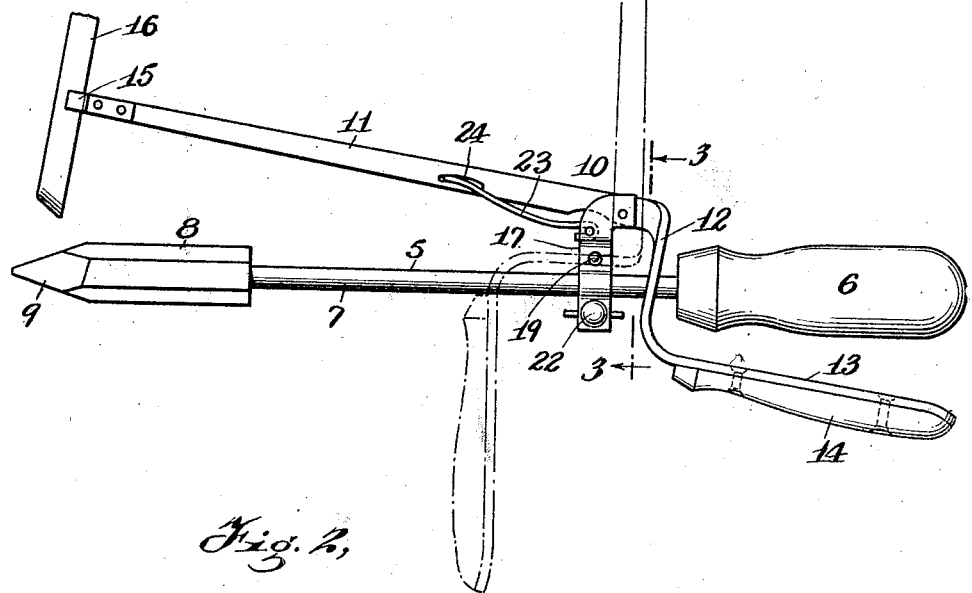
Fig. 1,
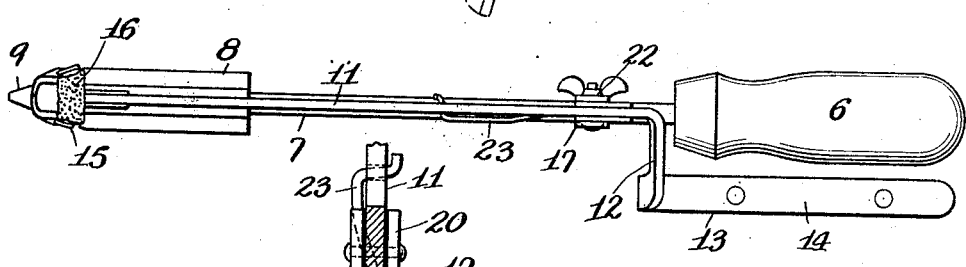
Fig. 2,
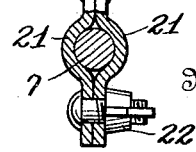
Fig. 3,
Inventor
Emery Menyhart
By his Attorneys
Edgar Pate Patented Apr. 1, 1924.

1,488,932

UNITED STATES PATENT OFFICE.

EMERY MENYHART, OF WEST NEW BRIGHTON, NEW YORK.

SOLDER HOLDER FOR SOLDERING IRONS.

Application filed February 15, 1923. Serial No. 619,182.

*To all whom it may concern:*

Be it known that I, EMERY MENYHART, a citizen of Austria-Hungary, and residing at West New Brighton, in the county of Richmond and State of New York, have invented certain new and useful Improvements in Solder Holders for Soldering Irons, of which the following is a specification, such as will enable those skilled in the art to which it appertains to make and use the same.

This invention relates to soldering irons and particularly to a device adapted to be detachably mounted in connection with a soldering iron of any kind or class to support a piece of solder in juxtaposition to the head of the iron and to permit of the movement of the solder toward and from said head, and the object of the invention is to provide a device of the class and for the purpose specified which by reason of its construction may be applied to soldering irons of any kind or class and adjusted thereon to bring the solder supporting means thereof in the desired relative position to the head of the iron, a further object of the invention being to provide a solder supporting device of the class and for the purpose specified which may be moved into an inoperative position and supported in such position in the operation of soldering the iron, a further object being to provide the solder supporting device with a handle member adapted to cooperate with the handle member of the soldering iron to facilitate the use of the entire tool by one hand of the operator, whereby the workpiece may be supported and guided by the other hand of the operator, and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a soldering iron showing my improvement mounted in connection therewith, and indicating the method of its use.

Fig. 2 is a plan view of the construction shown in Fig. 1; and,

Fig. 3 is a partial section on the line 3—3 of Fig. 1 on an enlarged scale.

In the drawing, I have indicated at 5 a soldering iron comprising a handle member 6, a shank 7, and a soldering head 8, which is pointed at its end as shown at 9 and at 10 I have shown one form of my improved solder suporting device.

In the construction shown my improved device 10 comprises an elongated rod 11, one end portion of which is bent at right angles as shown at 12, and again at right angles to form a handle member 13 provided with a wood or fibre facing 14, and the other end of the rod 11 is provided with a U-shaped spring jaw member 15 adapted to receive and frictionally engage a piece of solder 16.

The rod 11 adjacent to the offset portion 12 thereof is pivoted to a clamp device 17 which in the construction shown is composed of two sheet metal parts 18 riveted or otherwise secured together as shown at 19, and one end portion 20 of said clamp device or the separate parts 18 thereof is fashioned into U-shaped formation to receive the rod 11 and the other end portion thereof is fashioned to form jaw members 21 to receive the shank 7 of the soldering iron and to be clamped on said shank by a bolt and wing nut construction 22.

It will be understood that the clamp device 17 may be adjusted longitudinally of the shank 7 of the soldering iron to properly register the piece of solder 16 with the head 8 of the iron or the pointed tip 9 thereof. It will also be apparent that the handle member 13 of my improved device is positioned longitudinally of the handle member 6 of the soldering iron, whereby the operation of moving a piece of solder toward and from the head 8 may be accomplished by one hand of the operator or the hand supporting the soldering iron.

A spring 23 is mounted in connection with the clamp device 17 preferably between the U-shaped end 20 thereof, and the free end of said spring member cooperates with an elongated aperture 24 in the rod 11, and said spring normally serves to support the piece of solder 16 at a predetermined distance away from the head 8 of the iron as shown in full lines in Fig. 1 of the drawing, and the solder may be moved into engagement with the iron by the manipulation of the handle member 13. The attachment 10 may also be swung into the position indicated in dot and dash lines in Fig. 1 of the drawing in the operation of heating the head 8 of the iron in the usual manner, in order that the solder 16 may be kept away from the heat of the heating device for the head 8, and by providing the wood, fibre or other facing 14 to the handle member 13, a suitable heat insulation is provided, which will facilitate the operation of my improved device, and prevent the burning of the fingers of the operator in the event that the heat of the head 8 should pass through the rod 11 in excessive use thereof.

It will be understood that my improved device may be mounted in connection with or combined with soldering irons of various kinds and classes, and I am not necessarily limited to the specific method of attaching and adjusting the device as herein shown and described nor to the specific details of construction herein set out, and various changes in and modifications of the construction herein shown and described may be made within the scope of the appended claims without departing from the spirit of my invention or sacrificing its advantages.

Having fully described my invention what I claim as new and desire to secure by Letters Patent, is:—

1. A device of the class described comprising a rod provided at one end with a handle member, means at the other end of said rod for receiving and supporting a suitable solder, and a clamp device in connection with which said rod is pivotally mounted and adapted to be clamped on a soldering device.

2. A device of the class described comprising a rod provided at one end with a handle member, means at the other end of said rod for receiving and supporting a suitable solder, a clamp device in connection with which said rod is pivotally mounted, and adapted to be clamped on a soldering device and tensional means for supporting said rod in predetermined position.

3. A device of the class described comprising a rod, one end portion of which is offset and provided with a handle member, and the other end portion of said rod being provided with a spring jaw member adapted to receive and support a suitable solder, means in connection with which said rod is pivotally mounted for adjustably and detachably supporting said rod in connection with a suitable support.

4. A device of the class described comprising a rod, one end portion of which is offset and provided with a handle member, and the other end portion of said rod being provided with a spring jaw member adapted to receive and support a suitable solder, means in connection with which said rod is pivotally mounted for adjustably and detachably supporting said rod in connection with a suitable support, means for retaining said last named means in predetermined positions of adjustment, and tensional means for normally supporting said rod in predetermined position.

5. A device of the class described comprising a rod, one end portion of which is fashioned to form an offset handle member, means at the other end of the rod for receiving and supporting a suitable solder, and clamp devices pivotally connected with the rod adjacent to the offset end portion thereof and adapted to be clamped on a soldering device, and a spring coupled with said rod and said clamp device and adapted to retain said rod in predetermined position.

In testimony that I claim the foregoing as my invention I have signed my name in presence of the subscribing witnesses this 13th day of February, 1923.

EMERY MENYHART.

Witnesses:
 FRANK V. JOHANSEN,
 JOHN DRACO.